Oct. 20, 1931.    L. E. PADELFORD    1,828,542
METHOD OF TOASTING
Filed Feb. 11, 1930
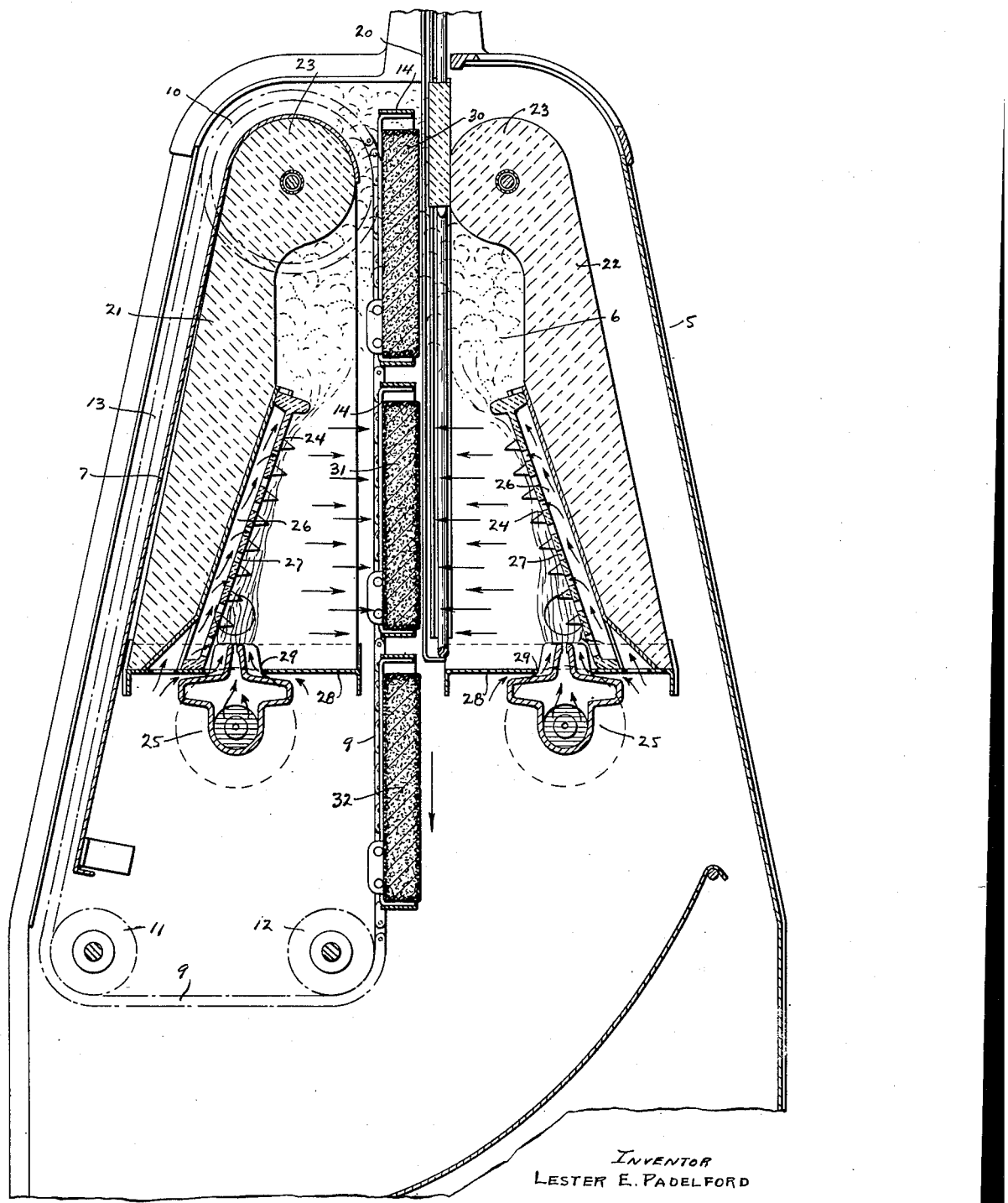
INVENTOR
LESTER E. PADELFORD
By J. W. Ellis
ATTORNEY Patented Oct. 20, 1931

1,828,542

UNITED STATES PATENT OFFICE

LESTER E. PADELFORD, OF BUFFALO, NEW YORK, ASSIGNOR TO THE REPUBLIC METAL-WARE COMPANY, OF BUFFALO, NEW YORK, A CORPORATION OF NEW YORK

METHOD OF TOASTING

Application filed February 11, 1930. Serial No. 427,595.

My invention relates in general to a method of toasting, and in particular to a method of toasting bread and other porous food stuffs.

It is well known to those skilled in the art that ordinarily bread being toasted is subjected to heated dry air having very little moisture with the result that the bread in the process of toasting is completely dried out, leaving its central portion, as well as its surfaces very crisp. The much preferred form of toast, however, is that having a soft, moist center with uniformly toasted, golden brown, exterior surfaces.

It has been an object of my invention to overcome the disadvantages of the present method, and to provide a method in which the slice of bread is first subjected to moist air, and then subjected to radiant heat which quickly toasts the exterior surfaces, thus sealing in the moisture, and thereby producing slices of toast having a moist center and thoroughly toasted exterior surfaces.

In the accompanying drawing I have shown one form of apparatus by which the above advantages may be derived, it being obvious that other forms of apparatus may be used with equal efficiency. In the drawing, the single figure is a vertical, sectional elevation of the device.

The device comprises an outer casing 5, having an oven or toasting chamber 6 arranged vertically through the middle thereof. Arranged near the front portion of the machine are conveyor chains 9 (one only of which is shown) which pass over suitable sprocket wheels 10, 11, and 12. The sprocket wheels are so arranged that the upward pass 13 of the chain lies substantially in the same plane as the front wall 7 of the casing, so that the toast baskets 14 carried by the chains will have substantially the same inclination as the front wall, whereby slices of toast placed upon them during the upward pass of the claims will be retained in position.

Suitable guide wires 20 are arranged adjacent the upward portion of the downward pass of the chains 9 whereby the toast will be retained in the baskets during the vertical downward pass of the same.

The oven of our device comprises preferably two oppositely arranged walls 21 and 22 each having an enlarged upper portion 23 which extends inwardly toward the center of the oven, thus restricting the opening in the upper end thereof. Near the lower end of the walls 21 and 22 are provided radiant elements 24, and beneath these radiant elements are suitable gas burners 25. Suitable passageways 26 are formed in the backs of the radiants as well as openings 27 formed through the face thereof, whereby auxiliary air may be supplied to the burning flame. The burners 25 are suspended from cross members 28, which have slots 29 formed therein for the insertion of the upper portion of the burners 25. Space is provided between the cross members and the burner parts, so that auxiliary air may be supplied to the burner. The cross members extend toward the center of the oven thus closing the bottom of the same, except for a centrally arranged slot through which the toast baskets pass.

The travel of the slices of bread is downwardly through the oven, as indicated by the arrow. Since the radiants 24 are arranged near the bottom of the oven, the bread as it enters the top of the oven is subjected to the moist, convected heat coming from the oppositely arranged burners. The moisture or water vapor is a product of combustion, and is the combination of the hydrogen of the gas with the oxygen of the air which forms practically pure distilled water at a temperature of approximately 700° F. This superheated water or steam is absorbed by the bread, and by the time the bread has reached the radiants, this moisture has thoroughly permeated the same.

As the bread now continues its travel to the lower part of the oven, it is subjected to the intense radiant heat which is brought to bear upon it as indicated by the arrows. This intense heat caramelizes or melts the sugar which is contained in the bread near the surface of the slice, and gives to it a golden brown, exterior surface. The heat is so intense, and the speed of travel of the slice of bread is such that during the interval of time necessary to give to the surface its desirable golden brown color, the moisture from the interior of the slice of bread can not escape but will be sealed into the finished piece of toast. In the drawing, the slice 30 of the bread is shown as entering the oven 6, the cloud of moisture or water vapor being represented by the broken lines. The slice in this position is subjected to these vapors, as above pointed out. The slice 31 is passing through the oven between the radiants and is receiving its exterior toasted surface. The slice 32 is passing out of the oven and is ready to be discharged from the device as a finished piece of toast.

The above description is particularly applicable to ordinary white bread, and when my method is employed in the toasting of whole wheat or "health" bread, which is usually low in sugar content, it is advisable to slow up the movement of the slice as it passes through the oven, since the time necessary to braise is considerably more than with white breads having a greater sugar content. When, for instance, raisin bread is to be toasted by my method, because of its high sugar content, owing to the presence of the raisins, the bread usually toasts much faster than ordinary, and it is then desirable to increase the speed of travel of the bread through the oven.

While I have shown gas burners for supplying heat for carrying out my method, and the utilization of the natural moisture of the burning gas, it is obvious that electricity or any other suitable source of heat may be used and the necessary moisture supplied from an independent source as, for instance, sprays of water or steam.

Having thus described my invention, what I claim is:

1. A method of toasting slices of bread, consisting in moistening the bread by subjecting it to moist convected heat, and then sealing in the moisture by subjecting the exterior surfaces of the toast to intense radiant heat.

2. A method of toasting slices of bread, consisting in passing the slices through an oven, exposing both sides of the slice to moist convected heat, and then subjecting the moistened slice to intense radiant heat, whereby the moisture is sealed into the finished toast.

3. A method of toasting slices of bread, comprising subjecting the slices to moisture, and then subjecting such slices to a toasting heat and thereby sealing the moisture within the slices.

4. A method of toasting slices of bread, comprising subjecting the slices to moisture, then subjecting such slices to convected heat, and then subjecting such slices to a toasting heat, whereby the moisture is sealed within the slices.

5. A method of toasting slices of bread, comprising creating a current of convected heat, moving the slices in a direction opposite to the movement of the convected heat, then subjecting the slices to moisture, and then subjecting such slices to a toasting heat, thereby sealing the moisture within the slices.

In testimony whereof, I have hereunto signed my name.

LESTER E. PADELFORD.